United States Patent
Jan

[19]

[11] Patent Number: 6,157,594
[45] Date of Patent: Dec. 5, 2000

[54] MOLE CHASER

[76] Inventor: Te-Chin Jan, 24F-1, No. 161 Sungteh Rd., Taipei, Taiwan

[21] Appl. No.: 09/314,882

[22] Filed: May 19, 1999

[51] Int. Cl.⁷ ..................................................... A01M 1/20
[52] U.S. Cl. ........................... 367/139; 116/22 A; 43/124; 119/719
[58] Field of Search ......................... 367/139; 116/22 A; 43/124; 119/719

[56] References Cited

U.S. PATENT DOCUMENTS

| | | | |
|---|---|---|---|
| 5,205,066 | 4/1993 | Jan | 43/124 |
| 5,822,917 | 10/1998 | Jan | 43/124 |
| 5,870,847 | 2/1999 | Hsiao | 43/124 |
| 6,000,169 | 12/1999 | Jan | 43/124 |

*Primary Examiner*—Ian J. Lobo
*Attorney, Agent, or Firm*—Dougherty & Troxell

[57] ABSTRACT

A mole chaser with improvements in the construction and method of audio frequency and vibration generation includes a main stem, a cap, a battery chamber and a control circuit board, suspended or loosely installed inside of the main stem to make constant contact with inside wall of the main stem, which has a buzzer mounted thereon for generating audio signal to chase away underground rodents, such as moles. The audio frequency produced by the energized buzzer will cause the resonance to circuit board to make it vibrate and strike the main stem to produce more low frequency noise and vibration to enhance mole-chasing effect.

6 Claims, 7 Drawing Sheets

MOLE CHASER

BACKGROUND OF THE INVENTION

1. Field of the Invention

This invention relates to a mole chaser and particularly to a mole chaser that has a suspended or loosely installed buzzer circuit board for generating different frequency vibration and noise to enhance moles chasing effect.

2. Description of the Prior Art

Research reports show that moles are sensitive to audio frequency less than 1000 Hz. Hence audio mole chasers now in the market place are mostly under 1000 Hz. FIG. 1 illustrates a prior art disclosed in U.S. Pat. No. 5,205,066. It includes a main stem A, a cap B, a battery chamber C, an audio frequency circuit D and a washer E. The circuit D has two flanges 402 engageable with two slots 301 formed in the battery chamber C. Through the electric circuit shown in FIG. 2 produce the audio vibration. There is about 1:7 charging and discharging coefficient when power supply passes R1 to the charge pin 7 of IC 555, 1–2 seconds charging-and-discharging cycle for C2 and the oscillation cycle from D2 to pin 6. The buzzer 3406 will generate an audio vibration at a frequency between 300 and 400 Hz to chase moles. The disadvantage of the prior art is that only one type of audio frequency can be generated. It provides insufficient mole-chasing effect.

SUMMARY OF THE INVENTION

In view of aforesaid disadvantage, it is therefore an object of this invention to provide a mole chaser that has a suspended or loosely installed buzzer circuit board which may vibrate and hit the main stem of the chaser to generate another type of vibration and noise besides the audio vibration signal produced by the buzzer for creating more effective mole chasing function. This invention causes no cost increase while enhancing and improving the mole chasing effect.

BRIEF DESCRIPTON OF THE DRAWINGS

The invention, as well as its many advantages, may be further understood by the following detailed description and drawings in which.

DETAILED DESCRIPTOIN OF THE PREFERRED EMBODIMENT

Figure 1:
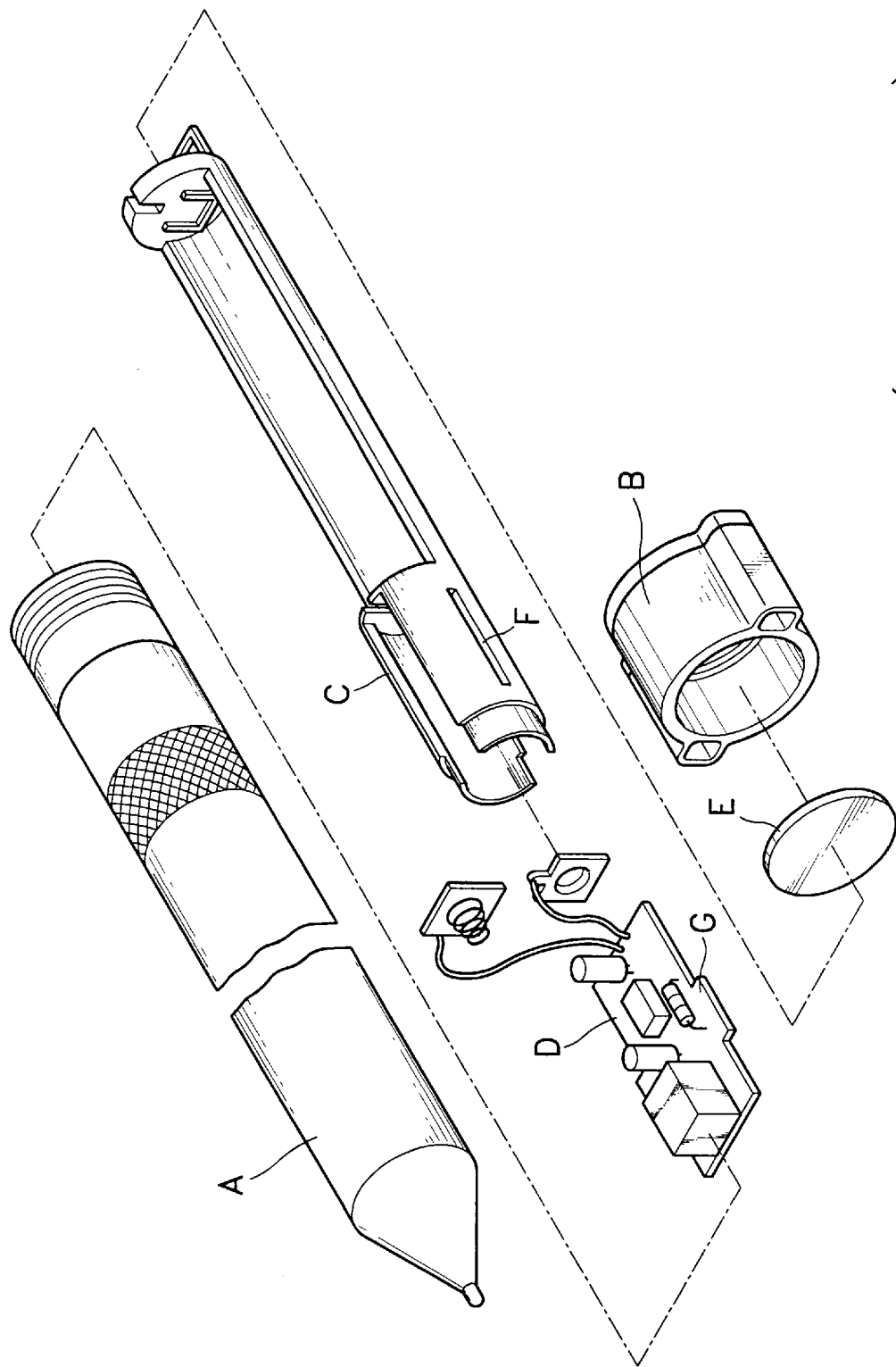
FIG. 1 is a perspective exploded view of a conventional mole chaser.
Figure 2:
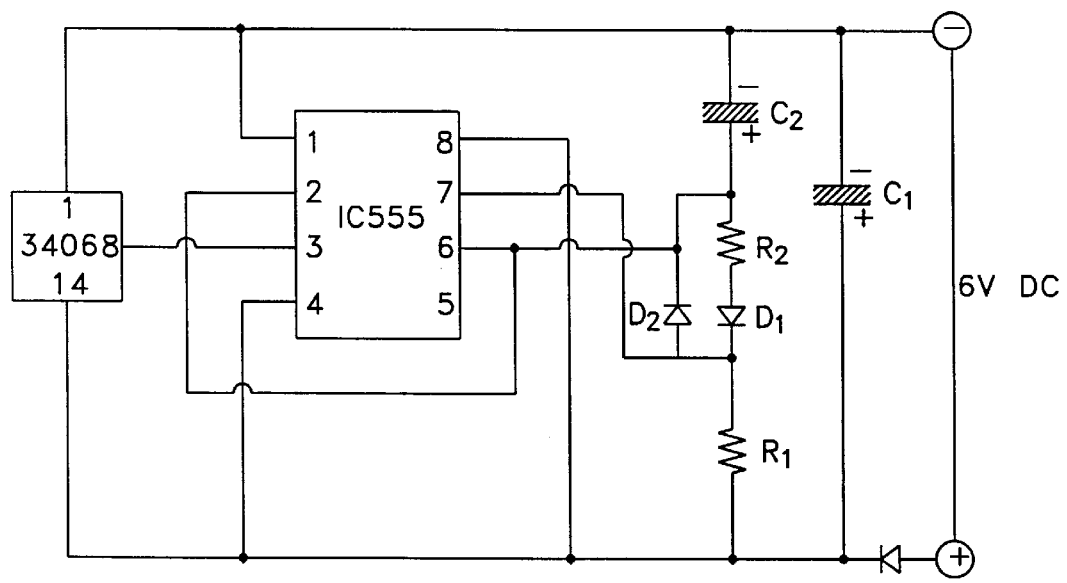
FIG. 2 is a circuit diagram used for the mole chaser shown in FIG. 1.
Figure 3:
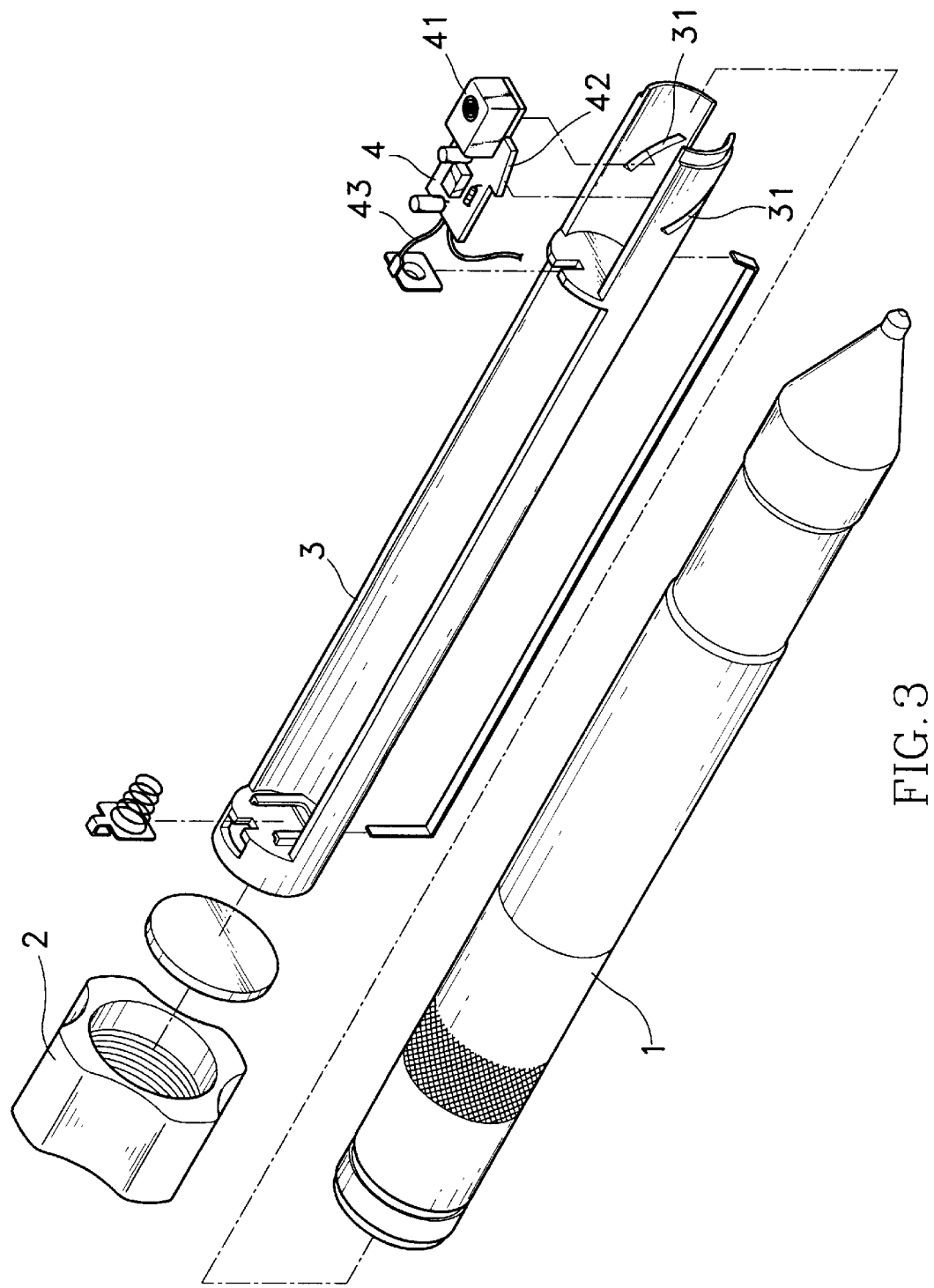
FIG. 3 is an exploded view of a first embodiment of this invention.

FIG. 3 shows a first embodiment of this invention. The mole chaser according to this invention includes a main stem 1, a cap 2, a battery chamber 3 and a control circuit board 4. The main stem 1 and the cap 2 are generally constructed like the conventional one set forth above and form no part of this invention, thus will be omitted here.

The control circuit board 4 has a buzzer 41 mounted thereon and is suspended or loosely located in the main stem 1 and makes contact with inside wall of the main stem. When the buzzer 41 is energized and generates audio frequency, the circuit board 4 will be resonated and vibrate to produce other audio signals different from those of the buzzer 41. The circuit board generating vibration frequency ranges from 100 HZ to 700 HZ (depending on contact condition between the circuit board and the main stem wall). Hence this invention may provide multiple mole chasing effect. The installations of the circuit board 4 can be various. The preferred installing ways are provided and be explained.

Figure 4:
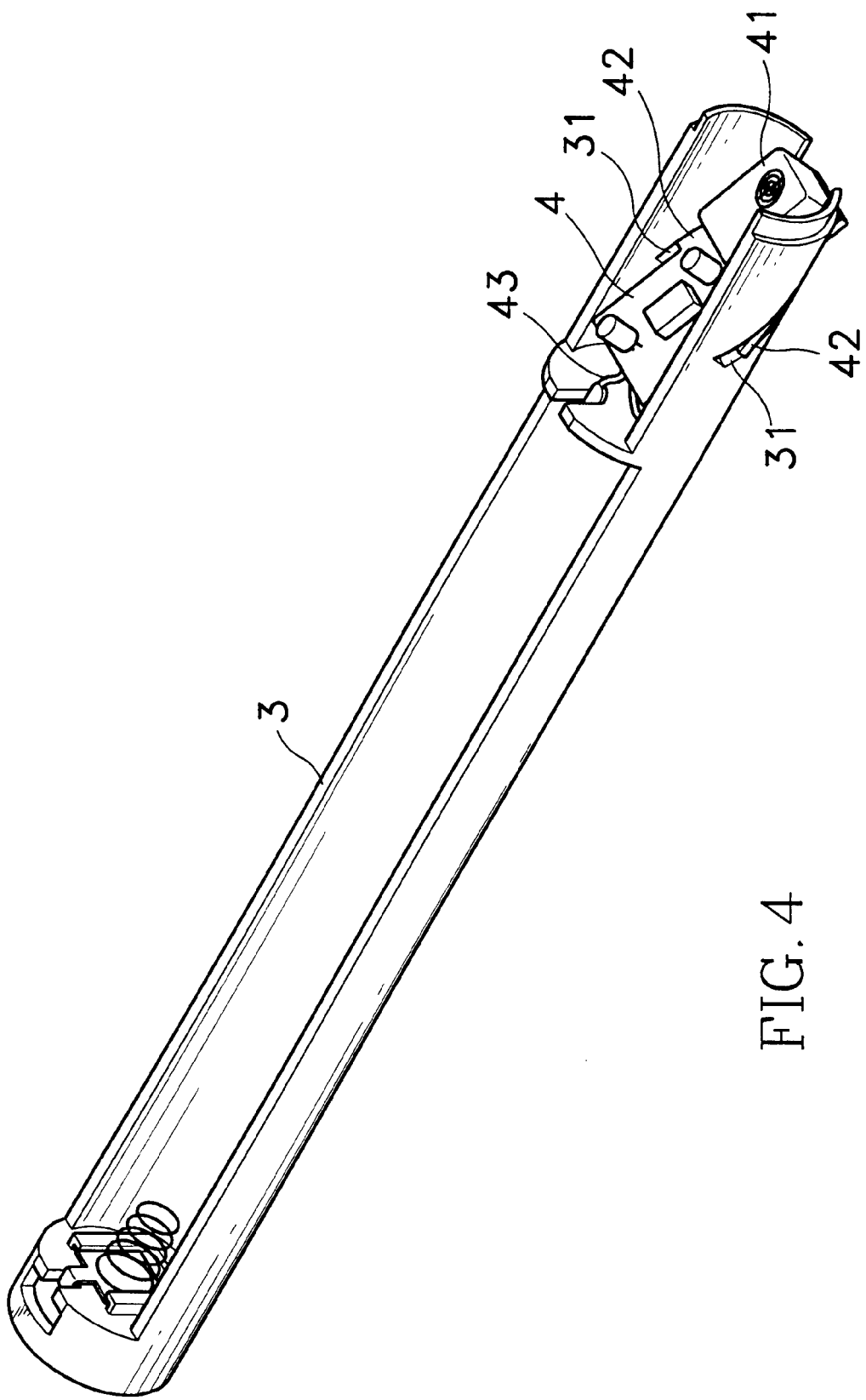
FIG. 4 is a fragmentary perspective view of this invention shown in FIG. 3.
Figure 5:
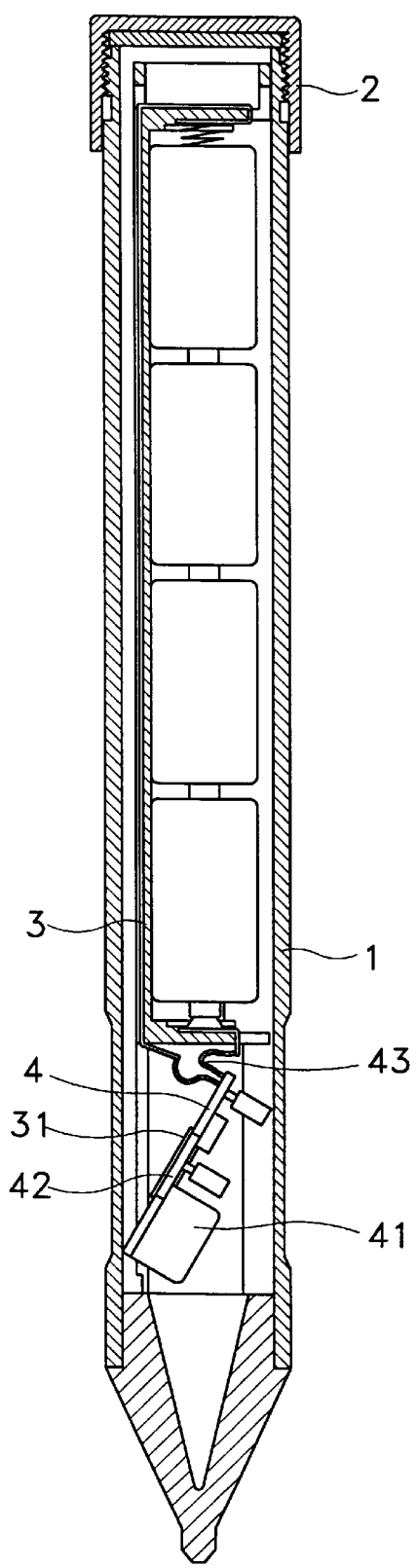
FIG. 5 is a sectional view of this invention shown in FIG. 3.

In the first embodiment shown in FIGS. 3, 4 and 5, the circuit board 4 has two side flanges 42 engageable with two oblique slots 31 located at two sides of the battery chamber 3. The circuit board 4 may slip downward in the oblique slots 31 due to gravity and make constant contact with the inside wall of the main stem 1 through the side flanges 42.

Figure 6:
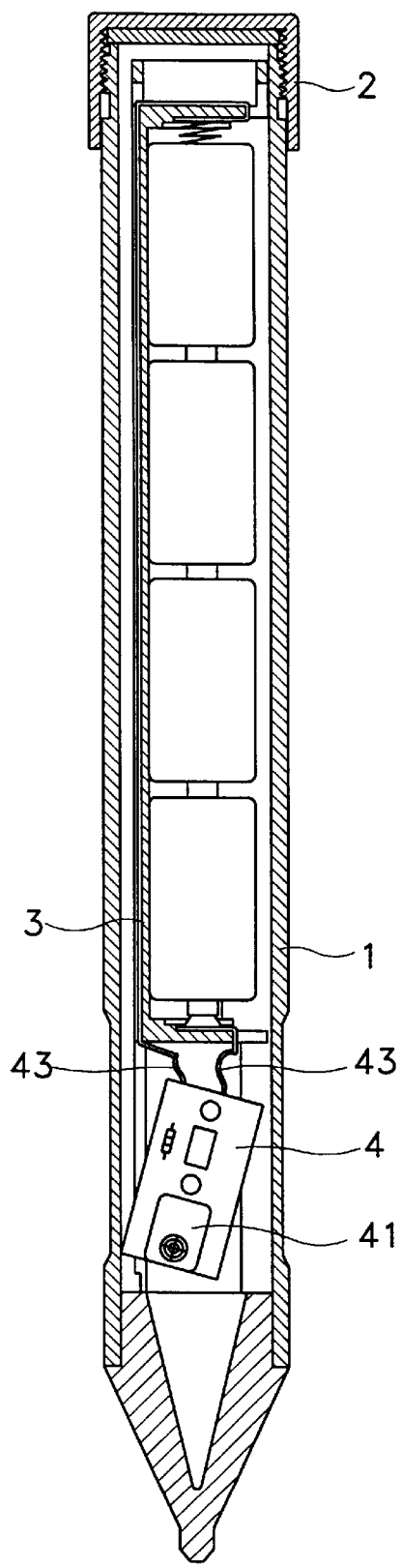
FIG. 6 is a sectional view of a second embodiment of this invention.

FIG. 6 shows a second embodiment of this invention. The circuit board 4 connects with the battery chamber 3 through two wires 43 of different length at one end of the circuit board. Another end of the circuit board 4 thus will be dragged biasly to make contact with the inside wall of the main stem 1. When the buzzer 41 is energized and generates audio frequency, the circuit board 4 will be able to strike the inside wall of the stem 1 to produce sound and generate vibration.

Figure 7:
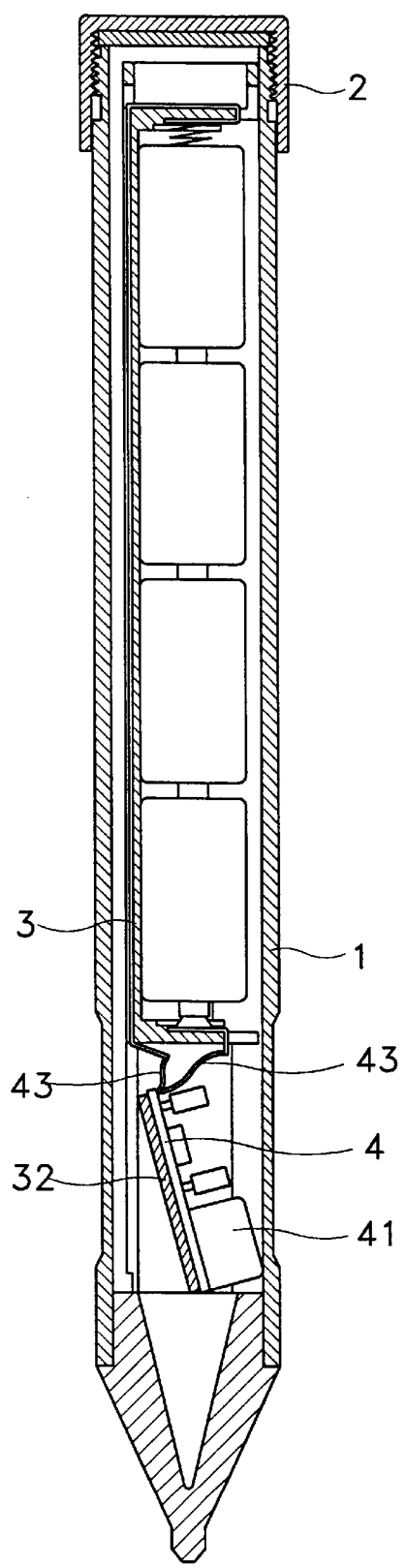
FIG. 7 is sectional view of a third embodiment of this invention.

FIG. 7 shows a third embodiment of this invention. A sloping board 32 is located in the room of circuit board 4 of battery chamber 3. The circuit board 4 can be dragged obliquely by its weight against the sloping board 32 to maintain the position of contacting with the inside wall of the stem 1 constantly.

All the embodiments of this invention set forth above enable the circuit board 4 be kept loosely but still maintain constant contact with inside wall of the main stem 1. Thus when the buzzer 41 is energized, the resulting audio frequency generated by the buzzer 41 will induce resonation in the circuit board 4 which in turn will vibrate and hit the main stem 1 to produce additional audio signal at different frequency from the signal generated by the buzzer 41. It thus provides a broad range of audio signal and may result in better mole chasing effect. This invention is made without any cost increase by changing the installation of circuit board. It also features with simple construction, easy maintenance, and additional audio frequency with vibration for more and better mole-chasing effect.

It may thus be seen that the present invention set forth herein, as well as those made apparent from the foregoing description, are efficiently attained. While the preferred embodiments of the invention have been set forth for purpose of disclosure, modifications (such as the changes of position, angles, direction of the sloping board 32) of the disclosed embodiment of the invention as well as other embodiments thereof may occur to those skilled in the art. Accordingly, the appended claims are intended to cover all embodiments which do not depart from the spirit and scope of the invention.

What is claimed is:

1. A mole chaser, comprising:

a hollow main stem;

a cap engageable with one end of the main stem;

a battery chamber housed in the main stem; and a control circuit board loosely installed in the main stem to make constant contact with an inside wall of the main stem, the control circuit board having a buzzer mounted thereon for generating an audio signal upon being energized, the audio signal causing the control circuit board to vibrate and hit the main stem to produce a low frequency audio noise for enhancing a mole chasing effect, wherein the control circuit board connects with the battery chamber by means of two wires of different lengths such that the control circuit board is biased and makes contact with the main stem.

2. The mole chaser of claim 1, wherein the control circuit board has two side flanges engageable with two oblique slots located at two sides of the battery chamber.

3. The mole chaser of claim 1, wherein the control circuit board attaches a sloping board at a bottom surface thereof for dragging the control circuit board obliquely inside the main stem.

4. A mole chaser, comprising:

a hollow main stem;

a cap engageable with one end of the main stem;

a battery chamber housed in the main stem; and a control circuit board loosely installed in the main stem to make constant contact with an inside wall of the main stem, the control circuit board having a buzzer mounted thereon for generating an audio signal upon being energized, the audio signal causing the control circuit board to vibrate and hit the main stem to produce a low frequency audio noise for enhancing a mole chasing effect, wherein the control circuit board has two side flanges engageable with two oblique slots located at two sides of the battery chamber.

5. The mole chaser of claim 4, wherein the control circuit board attaches a sloping board at a bottom surface thereof for dragging the control circuit board obliquely inside the main stem.

6. A mole chaser, comprising:

a hollow main stem;

a cap engageable with one end of the main stem;

a battery chamber housed in the main stem; and a control circuit board loosely installed in the main stem to make constant contact with an inside wall of the main stem, the control circuit board having a buzzer mounted thereon for generating an audio signal upon being energized, the audio signal causing the control circuit board to vibrate and hit the main stem to produce a low frequency audio noise for enhancing a mole chasing effect, wherein the control circuit board attaches a sloping board at a bottom surface thereof for dragging the control circuit board obliquely inside the main stem.

* * * * *